(12) United States Patent
Chen et al.

(10) Patent No.: US 10,970,889 B2
(45) Date of Patent: Apr. 6, 2021

(54) STROKE PREDICTION FOR STYLIZED DRAWINGS BASED ON PRIOR STROKES AND REFERENCE IMAGE

(71) Applicant: ADOBE INC., San Jose, CA (US)

(72) Inventors: Yilan Chen, Kowloon Tong (HK); Li-Yi Wei, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/368,632

(22) Filed: Mar. 28, 2019

(65) Prior Publication Data

US 2020/0311990 A1 Oct. 1, 2020

(51) Int. Cl.
*G06T 11/20* (2006.01)
*G06K 9/00* (2006.01)

(52) U.S. Cl.
CPC ........ *G06T 11/203* (2013.01); *G06K 9/00416* (2013.01); *G06K 9/00436* (2013.01); *G06T 2200/24* (2013.01)

(58) Field of Classification Search
None
See application file for complete search history.

(56) References Cited

U.S. PATENT DOCUMENTS

| 9,916,061 | B2 * | 3/2018 | Rhoades | ............ G06F 3/04817 |
| 2006/0250393 | A1 * | 11/2006 | Tsang | .................. G06F 3/04845 |
| | | | | 345/420 |
| 2013/0127869 | A1 * | 5/2013 | Winnemoeller | ...... G06T 11/203 |
| | | | | 345/441 |
| 2014/0108976 | A1 * | 4/2014 | Steiner | ................... G06K 9/222 |
| | | | | 715/765 |
| 2015/0221070 | A1 * | 8/2015 | Winnemoeller | ... G06K 9/00422 |
| | | | | 382/203 |
| 2019/0385003 | A1 * | 12/2019 | Elgammal | .............. G06N 20/00 |

OTHER PUBLICATIONS

Xing et al., "Autocomplete painting repetitions", ACM Transactions on Graphics, Article No. 172, Nov. 2014 (Year: 2014).*

(Continued)

*Primary Examiner* — David H Chu
(74) *Attorney, Agent, or Firm* — Shook, Hardy & Bacon L.L.P.

(57) ABSTRACT

Embodiments provide systems, methods, and computer storage media for generating stroke predictions based on prior strokes and a reference image. An interactive drawing interface can allow a user to sketch over, or with respect to, a reference image. A UI tool such as an autocomplete or workflow clone tool can access or identify a set of prior strokes and a target region, and stroke predictions can be generated using an iterative algorithm that minimizes an energy function considering stroke-to-stroke and image-patch-to-image-patch comparisons. For any particular future stroke, one or more stroke predictions may be initialized based on the set of prior strokes. Each initialized prediction can be improved by iteratively executing search and assignment steps to incrementally improve the prediction, and the best prediction can be selected and presented as a stroke prediction for the future stroke. The process can be repeated to predict any number of future strokes.

18 Claims, 8 Drawing Sheets

(56) References Cited

OTHER PUBLICATIONS

Li-Yi Wei, "Autocomplete Painting Repetitions", SIGGRAPH Asia 2014, URL: https://www.youtube.com/watch?v=m7MEAw46Ojo (Year: 2014).*

Ma, C., Wei, L. Y., & Tong, X. (Aug. 2011). Discrete element textures. In ACM Transactions on Graphics (TOG) (vol. 30, No. 4, p. 62). ACM.

Peng, M., Xing, J., & Wei, L. Y. (2017). Autocomplete 3d sculpting. arXiv preprint arXiv:1703.10405. 10 pages.

Xing, J., Chen, H. T., & Wei, L. Y. (2014). Autocomplete painting repetitions. ACM Transactions on Graphics (TOG), 33(6), 172.

Xing, J., Wei, L. Y., Shiratori, T., & Yatani, K. (2015). Autocomplete hand-drawn animations. ACM Transactions on Graphics (TOG), 34(6), 169.

* cited by examiner

STROKE PREDICTION FOR STYLIZED DRAWINGS BASED ON PRIOR STROKES AND REFERENCE IMAGE

BACKGROUND

Stylized illustrations (e.g., drawings, paintings, photographs, sketches, etc.) are common forms of art that require significant expertise and manual efforts to create. By using different shapes, tones, colors, lines, textures, arrangement of strokes, and other stylizations, users are able to create illustrations and other works of art with varied styles. Generally, drawings allow a user freedom to add their own expressions through various stylization techniques. In contrast to manual drawings, photography offers a quick creation process. However, photography offers less control and individual stylization opportunities. As such, when creating stylized illustrations, a user may desire to combine the convenience of photography with the artistic control of a drawing.

Conventional methods for creating stylized illustrations may only grant users limited, high-level control. However, users usually prefer controls on various levels of granularity. Additionally, some conventional systems may allow users to control the spatial distribution by creating a labeled guidance map, yet users still have no direct interaction with the final illustration, which can be essential to creativity. Existing applications aim to preserve a user's personal style while beautifying their sketches. But these systems (such as onion skinning) require manual input of individual strokes, which can be a tedious task. Moreover, other conventional methods have the ability to automate only certain drawing and painterly effects using photos. For example, in some applications, a user can select a texture stamp which multiplies with an underlying image intensity to produce various stroke effects. These techniques are mostly practiced by professionals who have the required tools and expertise to obtain naturally appearing effects. Accordingly, there has been minimal effort to develop user-assisted drawing applications.

SUMMARY

Embodiments of the present invention involve generation of stroke predictions based on prior strokes and a reference image. At a high level, an interactive drawing interface may be provided that allows a user to input a stroke-based drawing, such as a sketch, with respect to a reference image. A correlation among a user's prior strokes and a correlation between a user's prior strokes and a reference image can be identified and used to generate predicted strokes that may indicate where the user intends to draw next. A stroke prediction algorithm can be implemented as an iterative algorithm that minimizes an energy function considering stroke-to-stroke and image-patch-to-image-patch comparisons. The user may accept, ignore, or modify the predicted strokes, thereby maintaining full control over the artistic process.

Generally, an interactive drawing interface may be provided with a UI tool, such as an autocomplete tool or a workflow clone tool, that generates stroke predictions. In an example implementation of an autocomplete tool, as a user draws strokes on top of a reference image, a target region (e.g., a 1D path or 2D region) and a designated number of prior strokes within a spatio-temporal neighborhood are automatically identified, and stroke predictions are generated for the target region. In an example implementation of a workflow clone tool, a user selects the group of prior strokes and/or the target region, and stroke predictions are generated for the target region. Stroke predictions can be generated along a 1D path associated with the target region until some designated condition occurs (e.g., the target region is filled, a particular prediction fails to converge within a designated number of iterations, a particular prediction fails to converge within a threshold of similarity, etc.). The predicted strokes can be presented on the interactive drawing interface, and any or all of the predicted strokes can be accepted, declined, modified, or the like. Accordingly, the interactive drawing UI allows users to quickly complete partial drawings with minimal effort.

Generally, stroke predictions for a stroke-based drawing such as a sketch can be generated using any suitable algorithm. For example, stroke predictions for a plurality of future strokes can be generated by sequentially identifying a transformed prior stroke whose neighborhood best matches the neighborhood of a current stroke, considering stroke-to-stroke and image-patch-to-image-patch comparisons (e.g., stroke and reference neighborhood comparisons). For any particular future stroke, one or more stroke predictions may be initialized with initial predictions based on prior strokes in a partial sketch. An initial prediction for a particular future stroke can be improved by iteratively executing search and assignment steps to incrementally improve the prediction, and the best prediction can be selected and presented as a stroke prediction for the future stroke. The process can be repeated to generate predictions for any number of future strokes.

As such, techniques described herein facilitate generating stroke predictions based on prior strokes and an underlying reference image, and therefore provide novice users the ability to seamlessly complete a partial sketch without compromising the simplicity of the user interface. Further, the present techniques significantly reduce the amount of artistic effort required by a user, while preserving the user's personal style, providing a flexible input interface, and leaving artistic control over the creative process in the hands of the artist. Finally, unlike conventional techniques, the stroke prediction techniques described herein may match the combination of artistic style and reference image correspondence better than in prior techniques.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Overview

Figure 1:
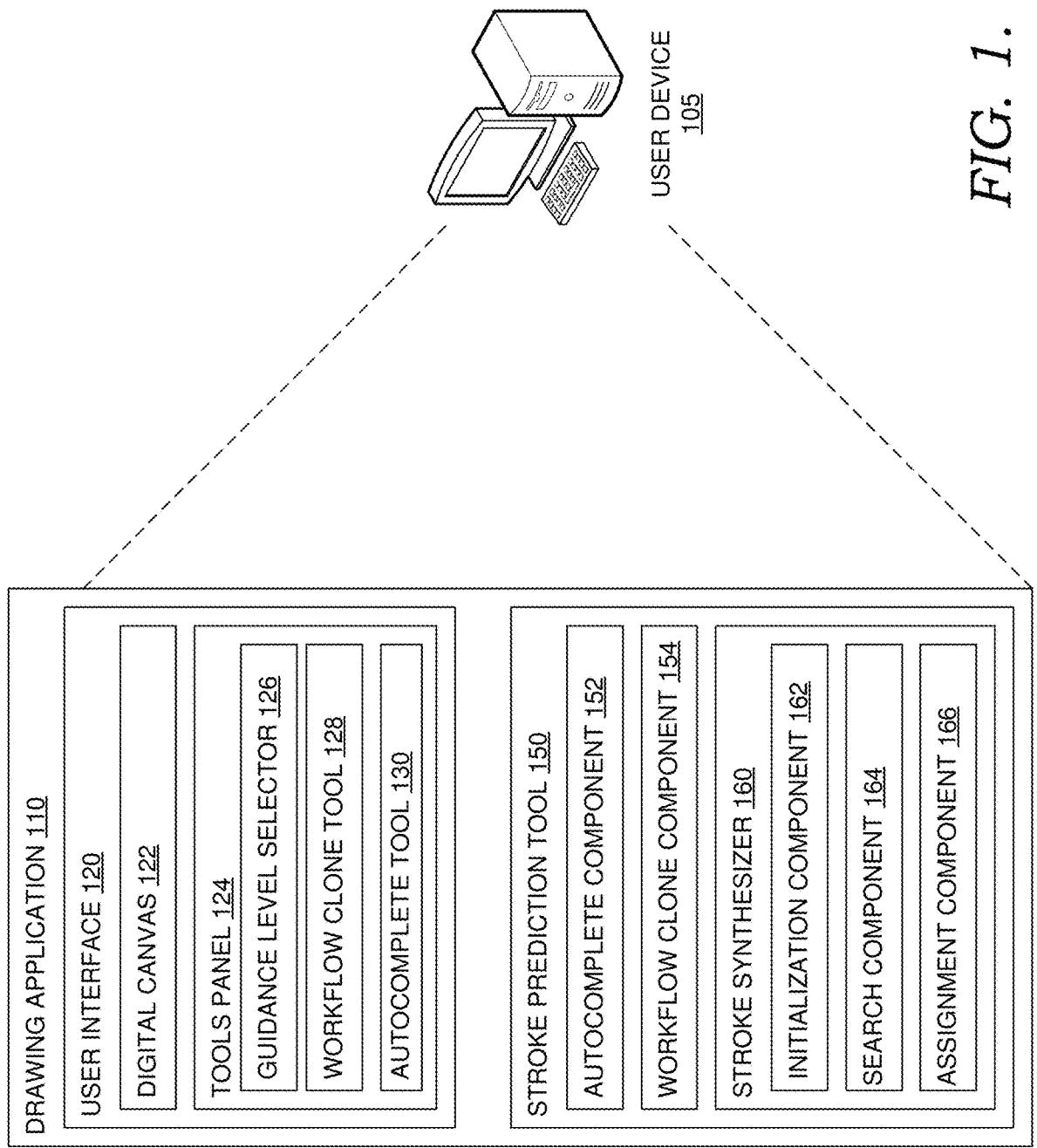
FIG. 1 is a block diagram of an example stroke prediction system, in accordance with embodiments of the present invention.

Stylized illustration is a common art form and communication medium, but can require significant artistic expertise and manual effort. A number of techniques are currently available to assist artists in creating stylized drawings, including reference sketching, painterly stylization, interactive drawing assistance tools, and workflow-based authoring. Artists often use reference materials, such as images or videos, as a guide for manual sketching. However, this process is largely manual and primarily used by professionals who have the required expertise to produce sketches with natural effects. Some automated tools can leverage a reference image in limited ways. For example, one existing tool allows a user to automate certain painterly effects from reference photos by selecting a texture stamp which multiplies with an underlying image intensity to produce stroke effects. However, automated tools such as these limit the degree of artistic freedom available to the artist.

Another conventional technique is painterly stylization, which converts a photo into a digital painting. There are numerous techniques in stylization, which can be roughly divided into procedural methods and data-driven methods. Algorithmic methods include programmed image filters, stroke-based compositions, procedural methods, and the like. Although these methods can create impressive results, they are limited to the specific style determined by the algorithm.

Typical data-driven stylization methods aim to produce results that are similar to an arbitrary reference image input. The underlying concept is image analogy, which learns a mapping from a pair of source image and stylized image (A, A'), which can then be applied to a new image B to get an "analogous" image B'. One example technique uses region matching, where each pixel of the output image is assigned the best-matching pixels from an example pair. Some techniques may improve the output image using texture optimization. However, assigning each pixel in the output image is computationally expensive and potentially unnecessary in certain circumstances. One prior technique performs example-based stylization of strokes by learning statistical transfer functions from a source image and a completed stroke-based sketch example, using the statistical transfer functions to predict stroke properties for rendering, given a new input image. However, this technique only considers the orientation of individual strokes, ignoring other potentially valuable information. Further, this technique requires a complete example sketch and therefore cannot be used to predict strokes to complete a partial sketch.

Some recent stylization techniques have used convolutional neural networks to separately model the content and style of an image. The use of a neural network allows the network to adapt to arbitrary styles and produce robust results. The neural network can stylize drawings based on online image optimization or offline model optimization with online synthesis. However, these techniques are often unsuitable for interactive user systems due to the amount of time required to produce results. Additionally, these techniques generally only work with fully complete sketches and allow minimal user control. For example, one prior technique allows users to control only global parameters, such as scale and color. Another technique only allows users to control spatial and semantic locations via labeled doodling (aka texture-by-numbers). Such high-level control over an automated process is often insufficient for users wishing to control fine details of their works.

Accordingly, embodiments of the present invention are directed to generating stroke predictions based on strokes in a stroke-based drawing, such as a sketch, and an associated reference image. More specifically, stroke predictions can be generated based on an analysis of strokes from a set of previous strokes in a stroke-based drawing (stroke analogy) and an analysis of image patches from an associated reference image (reference image analogy). At a high level, a correlation among a user's prior strokes and a correlation between a user's prior strokes and a reference image can be identified and used to generate predicted strokes that may indicate where the user intends to draw next. In some embodiments, a stroke prediction algorithm can be implemented as an iterative algorithm that minimizes an energy function considering stroke-to-stroke and image-patch-to-image-patch comparisons. The user may accept, ignore, or modify the predicted strokes, thereby maintaining full control over the artistic process through an interactive user interface (UI) tool. The predicted strokes can continue updating as a user continues drawing strokes on a digital canvas.

Generally, an interactive drawing interface may be provided that allows a user to input a stroke-based drawing, such as a sketch, with respect to a reference image (e.g., by drawing in a layer superimposed on top of the reference image). Stroke predictions can be generated using any number of UI tools, such as an autocomplete tool or a workflow clone tool. In an implementation of an autocomplete tool, as a user draws strokes on top of a reference image, a designated number of prior strokes within a spatio-temporal neighborhood are identified. A target region (e.g., a 1D path or 2D region) is automatically identified, and stroke predictions are generated for the target region. In an example implementation of a workflow clone tool, a user selects a group of prior strokes and a target region (e.g., a 1D path or 2D region), and stroke predictions are generated for the target region. Successive strokes can be predicted along a 1D path associated with the target region until some designated condition occurs (e.g., the target region is filled, a particular prediction fails to converge within a designated number of iterations, a particular prediction fails to converge within a threshold of similarity, etc.). The predicted strokes can be presented via the interactive drawing interface as stroke suggestions, and any or all of the stroke suggestions can be accepted, declined, modified, or the like. As such, the interactive drawing interface can assist users to quickly complete partial drawings with minimal effort.

Stroke predictions can be generated using any suitable algorithm. In some embodiments, stroke predictions for a stroke-based drawing, such as a sketch, can be generated by sequentially identifying a transformed prior stroke that best matches the current stroke, considering stroke-to-stroke and image-patch-to-image-patch comparisons (e.g., stroke and reference neighborhood comparisons). The stroke prediction algorithm can be an iterative algorithm that minimizes an energy function considering stroke-to-stroke and image-patch-to-image-patch comparisons. For example, a particular stroke prediction can be generated by initializing one or more initial predictions and iteratively executing search and assignment steps to incrementally improve the predictions through successive iterations. Predicted strokes can be initialized based on prior strokes in a partial sketch (e.g., multiple initializations for a prediction of a particular future stroke, each initialization based on a different prior stroke). Each initialized prediction for a particular future stroke can be improved by iteratively executing search and assignment steps, and the best prediction can be selected and presented as a prediction for the future stroke.

More specifically, to generate a prediction for a particular future stroke, one or more predictions can be initialized by designating a stroke as an initial prediction. Each initial prediction can be iteratively refined, and the best prediction can be selected and used as the prediction for the future stroke. For example, a designated number of prior strokes (e.g., immediately preceding the particular future stroke, within a spatio-temporal neighborhood, etc.) can each be propagated and used to initialize a separate initial prediction, applying an appropriate transformation to the prior stroke to locate the initial prediction at a corresponding position for the future stroke in the target region. Each of the initial predictions can be refined by iteratively executing search and assignment steps. During the search step, a designated number of prior strokes can be searched and evaluated to identify a prior stroke that minimizes a particular energy function considering stroke-to-stroke and image-patch-to-image-patch neighborhood comparisons. Generally, the energy function provides a measure of similarity, so minimizing the energy function maximizes similarity. A current stroke (e.g., the most recently drawn stroke, a stroke being drawn, the most recently finalized predicted stroke, etc.), or some other baseline stroke, can be used as a baseline for comparison. Thus, for a particular initial prediction of a subsequent stroke, each of the designated number of prior strokes can be transformed and evaluated against the current stroke by comparing stroke neighborhoods (e.g., stroke-to-stroke, sample-to-sample, etc.) and associated reference neighborhoods of a reference image (e.g., patch-to-patch, property-to-property, etc.). The stroke that minimizes the energy function (whether one of the prior strokes or the initial prediction) is selected as the output of the search step. During the assignment step, the selected stroke is assigned to be a current prediction (e.g., that replaces the initial prediction) by applying an appropriate transformation to the selected stroke to locate it at a corresponding position for the current prediction in the target region. The search and assignment steps can be repeated a designated number of iterations, until the current prediction converges within a threshold of similarity, or based on some other criteria (whether user-selected, pre-determined, or otherwise). The refined outputs for each of the initialized predictions can be compared, and the best one (e.g., the one that minimizes the energy function) can be used as the prediction for the particular future stroke. The process can be repeated to generate predictions for any number of future strokes.

Accordingly, the present technique can be used to generate predictions based on prior strokes and an underlying reference image. As a result, the generated predictions match the combination of artistic style and reference image correspondence better than in prior techniques. As such, the present technique significantly reduces the amount of effort required by a user, while preserving the user's personal style, providing a flexible input interface, and leaving artistic control over the creative process in the hands of the artist. Thus, the present technique allows even novice users to complete a partial sketch without compromising the simplicity of the user interface.

Having briefly described an overview of aspects of the present invention, various terms used throughout this description are provided. Although more details regarding various terms are provided throughout this description, general descriptions of some terms are included below to provide a clear understanding of the ideas disclosed herein:

A stroke generally refers to a segment of a drawing such as a sketch. A stroke may correspond to a drawing gesture made without lifting a pen, pencil, stylus, or other input tool. In some embodiments, a stroke b can be defined by a set of point samples {s} representing the stroke. Any or all samples can be associated with values for any number of properties, including, by way of nonlimiting example, (1) spatial parameters $\hat{p}(s)$, such as 2D position and local frame; (2) appearance parameters $\hat{a}(s)$, like thickness, color, and texture; and (3) sample index $\hat{t}(s)$, which can be normalized to [0, 1], where 0 represents the start of a stroke and 1 represents the end.

The difference between point samples can be defined based on the values of one or more associated properties. For example, the difference between two point samples may include one or more elements that account for the difference between the structure, appearance and/or time stamp of the point samples. In one example, the difference between point samples s and s' can be represented by the following equation: $\hat{u}(s', s)=(\hat{p}(s', s), \hat{a}(s', s), \hat{t}(s', s))$, where $\hat{p}(s', s)$ is measured from the local coordinate frame of s. The difference between strokes can be characterized based on the difference between the strokes' samples. Thus, the difference between strokes b and b' can be quantified and represented as: $\hat{u}(b', b)=\{\hat{u}(s', s)|s'\in b', s\in b\}$, where the pairs (s', s) are matched by index.

As used herein, a sample neighborhood, n(s), refers to the set of strokes whose spatial and/or temporal distance to point sample s are both within one or more designated thresholds. A distance within spatial and temporal thresholds is also referred to as a spatio-temporal neighborhood. By way of nonlimiting example, the spatial distance may be designated in pixels, and the temporal distance may be designated in seconds. Of course, any unit of measure may be used. A stroke or sample that lies partially within a spatio-temporal neighborhood may, but need not, be included in the sample neighborhood.

A stroke neighborhood, n(b), generally refers to the union of a stroke's sample neighborhoods (e.g., the set of strokes whose spatial and temporal distance from any given point sample in b is within a designated spatio-temporal neighborhood of the point sample). Thus, in one example, the similarity between stroke neighborhoods for two strokes $b_o$ and $b_i$ can be characterized by a measure of similarity between one or more sets of paired strokes from each neighborhood, a measure of similarity between representative strokes for each neighborhood, a measure of similarity between a representative stroke and its neighborhood, some combination thereof, or otherwise. For example, stroke neighborhoods, $n(b_o)$ and $n(b_i)$, can be aligned by identifying representative strokes for each neighborhood, transforming the local orientation of one or both of the neighborhoods to align the representative strokes, and matching pairs of strokes, one from each neighborhood. A representative stroke for a stroke neighborhood n(b) of a stroke b can be determined in any suitable way (e.g., selection of one of the strokes in the stroke neighborhood as being representative such as stroke b, averaging some or all strokes in the stroke neighborhood, weighting more recent or spatially closer strokes to stroke b higher, some other statistical technique, etc.). Similarity between stroke neighborhoods can be determined based on a comparison of any or all of the stroke pairs (e.g., representative strokes, each of the stroke pairs, etc.). Similarity between stroke neighborhoods for two strokes $b_o$ and $b_i$ may additionally or alternatively include a measure of similarity, for each stroke neighborhood being compared, between a representative stroke and its neighborhood, such as the sum of squared difference between stroke b and the representative stroke of the stroke neighborhood n(b). These are meant simply as examples, and any technique may be applied to determine similarity between stroke neighborhoods.

A reference neighborhood of a particular point sample or stroke generally refers to a region (e.g., a patch) of a reference image associated with the point sample or stroke. Generally, a drawing may be created on top of, with respect to, or otherwise associated with, a particular reference image. Thus, the reference neighborhood is a portion of the associated reference image corresponding to a particular portion of the drawing. A reference neighborhood for a particular stroke can be defined by a patch of any shape (e.g., a square patch) and any size. The patch can be associated with a stroke in any way, such as by centering the patch at any portion of the stroke (e.g., the center position, one of the stroke's samples, etc.), considering a transformation from canvas coordinates to image coordinates, and the like. In some embodiments, each point sample may be associated with its own reference neighborhood (e.g., associated patch of the reference image). Each patch can include any number of feature channels (e.g., three color channels in the CIE L*c*h color space and two gradient channels of luminance (L, c, h, $\nabla_x L$, $\nabla_y L$), etc.).

Similarity between reference neighborhoods for two strokes $b_o$ and $b_i$ can be characterized by a measure of similarity between the neighborhoods. For example, one or more patches of a reference image associated with each stroke can be compared to determine the measure of similarity. In one example, a representative patch for each stroke can be identified (e.g., by selecting a patch centered to a particular stroke, averaging patches for any number of samples for a particular stroke, using some other suitable technique for identifying a composite patch, etc.), and the distance between representative patches for each stroke can be used as the measure of similarity. In another example, any number of patches may be identified for a given stroke, and multiple patches can be compared for different strokes. For example, given two strokes $b_o$ and $b_i$, the strokes can be aligned by matching their corresponding sample pairs ($s_o$, $s_i$) according to sample index, and associated patches for each sample can be compared and aggregated to arrive at the measure of similarity. Generally, to compare patches, the patches can be sampled (e.g., sampling at the corners, along the boundary, throughout the patch, etc.), and similarity can be determined as the sum of the squared distances between corresponding reference patch samples (e.g., pixel values, color intensity, etc.) for each aligned sample. Any suitable technique may be applied to compare patches and/or patch samples.

Example Stroke Prediction Environment

Referring now to FIG. 1, a block diagram of example environment 100 suitable for use in implementing embodiments of the invention is shown. Generally, environment 100 is suitable for generating stroke predictions, and, among other things, facilitates generation of stroke predictions based on prior strokes and a reference image. User device 105 can be any kind of computing device capable of facilitating the generation of stroke predictions. For example, in an embodiment, user device 105 can be a computing device such as computing device 800, as described below with reference to FIG. 8. In embodiments, user device 105 can be a personal computer (PC), a laptop computer, a workstation, a mobile computing device, a PDA, a cell phone, or the like.

In the embodiment illustrated by FIG. 1, user device 105 includes drawing application 110 which itself includes interactive user interface (UI) 120 and stroke prediction tool 150. UI 120 includes a digital canvas 122 and a tools panel 124. Tools panel 124 may include a guidance level selector 126, a workflow clone tool 128, and an autocomplete tool 130. Stroke prediction tool 150 includes an autocomplete component 152, a workflow clone component 154 and a stroke synthesizer 160. Stroke synthesizer 160 further includes an initialization component 162, a search component 164 and an assignment component 166. The components of environment 100 are generally communicatively coupled to one another. Although the components of environment 100 are depicted as residing on one device, this need not be the case. In embodiments in which the components of environment 100 reside on multiple devices, the components may communicate with each other via a network (not depicted), which may include, without limitation, one or more local area networks (LANs) and/or wide area networks (WANs). Such networking environments are commonplace in offices, enterprise-wide computer networks, intranets, and the Internet.

As illustrated, user device 105 includes stroke prediction tool 150. The stroke prediction tool 150 may be incorporated, or integrated, into an application or an add-on or plug-in to an application, such as drawing application 110. Drawing application 110 may generally be any application capable of facilitating stroke-based drawings, such as sketches, and generation of stroke predictions. Drawing application 110 may be a stand-alone application, a mobile application, a web application, or the like. In some implementations, the application comprises a web application, which can run in a web browser, and could be hosted at least partially server-side. In addition, or instead, the application can comprise a dedicated application. In some cases, the application can be integrated into the operating system (e.g., as a service). Example applications that may be used to generate stroke-based drawings include ADOBE PHOTOSHOP® and ADOBE ILLUSTRATOR®. Stroke prediction tool 150 is generally discussed herein as being associated with an application. However, in some cases, stroke prediction tool 150, or portion thereof, can be additionally or alternatively integrated into the operating system (e.g., as a service) or a server (e.g., a remote server).

In the embodiment illustrated in FIG. 1, UI 120 includes digital canvas 122 and tools panel 124. Digital canvas 122 can be any type of panel, window, region, interaction element, or the like configured to accept and/or display strokes or other drawing elements. Input strokes may be received via a pen, pencil, stylus, computer mouse, or other suitable input device (not depicted). In some embodiments, digital canvas 122 may present a reference image (e.g., in a transparent layer) such that a drawing may be input on top of, or with reference to, the reference image. Thus, the user may input strokes onto digital canvas 122 on top of the reference image, allowing the user to use the reference image as guidance when drawing strokes on digital canvas 122.

Tools panel 124 may contain guidance level selector 126. Guidance level selector 126 can accept a user input adjusting the transparency of the reference image displayed on digital canvas 122, a level of detail of the reference image to display, some combination thereof, and the like. With respect to detail, different users may desire different levels of guidance for a reference image. For example, some users may desire to display only salient lines of a reference image, while others may desire to display the full image. Generally, providing more detail can allow a user to more accurately and precisely trace and/or follow the reference image when inputting strokes on digital canvas 122. As such, an interaction element may be provided for adjusting the level of detail, separately or in combination with a control for the degree of transparency. For example, a user may adjust transparency by sliding a first scroll bar until a desired transparency is reached. In another example, a user may adjust the level of detail by sliding a second scroll bar to adjust the level of detail. These and other variations are contemplated within the present disclosure.

In FIG. 1, tools panel 124 includes workflow clone tool 128. Workflow clone tool 128 provides one or more interaction elements that allow a user to select a group of prior strokes on digital canvas 122 and a target region of digital canvas 122 (e.g., a 1D path or 2D region) for which to generate stroke predictions. This function can be thought of as cloning a selected workflow of prior strokes in a manner that is adapted to the target region. For example, selecting workflow clone tool 128 from the tools panel 124 can enable a workflow clone mode, in which the user may designate one or more prior strokes and a target region on digital canvas 122. For example, a user may designate one or more prior strokes by selecting individual strokes, drawing a bounding box or other shape around strokes, drawing a guide stroke that intersects strokes, and the like. In some embodiments, a user may designate a 1D path target region by drawing, placing, or otherwise identifying a guide stroke on the digital canvas 122. In some embodiments, a user may designate a 2D region as the target region by drawing, placing, or otherwise identifying a boundary for the region in the digital canvas 122. As explained in more detail below, workflow clone component 154 and/or stroke synthesizer 160 can generate stroke predictions for the target region based on the designated prior strokes and a reference image.

In some embodiments, tools panel 124 includes an autocomplete tool 130. Autocomplete tool 130 is a UI component that provides one or more interaction elements that allow a user to enable or disable autocomplete functionality implemented by autocomplete component 152. For example and as explained in more detail below, if a user selects an interaction element provided by autocomplete tool 130 to engage the autocomplete functionality, autocomplete component 152 can automatically detect a set of prior strokes and a target region on digital canvas 122, and autocomplete component 152 and/or stroke synthesizer 160 can generate stroke predictions and present them in the target region. The user may accept, decline, or modify the stroke predictions using any suitable tool.

In some embodiments, drawing application 110 includes a stroke prediction tool 150 for generating stroke predictions. Stroke prediction tool 150 may include an autocomplete component 152, a workflow clone component 154, and a stroke synthesizer 160. Generally, autocomplete component 152 and workflow clone component 154 may use stroke synthesizer 160 to generate stroke predictions to support autocomplete and workflow clone functions, respectively. Stroke synthesizer 160 includes an initialization component 162, a search component 164, and an assignment component 166. At a high level, initialization component 162 initializes one or more stroke predictions, and search component 164 and assignment component 166 iteratively improve predictions through successive iterations.

In the embodiment illustrated in FIG. 1, autocomplete component 152 generates predicted strokes using stroke synthesizer 160 when autocomplete mode is enabled (e.g., autocomplete tool 130 is selected and/or engaged). More specifically, autocomplete component 152 can analyze strokes of a partial drawing (e.g., prior user-drawn strokes) on digital canvas 122 to generate predictions for future strokes. To do this, autocomplete tool 130 can identify a designated number of prior strokes within a spatio-temporal neighborhood of a particular stroke (e.g., a most recently entered stroke, a most recently predicted stroke, a selected stroke, etc.). The spatio-temporal neighborhood can be defined by one or more thresholds, any of which may be user-selectable, pre-determined, or otherwise. For example, a spatio-temporal neighborhood can be defined based on a threshold number of strokes preceding a particular stroke (e.g., 5 strokes), a threshold duration of time prior to input or generation of a particular stroke, some combination thereof, or otherwise. Additionally or alternatively, autocomplete component 152 can automatically identify a target region (e.g., a 1D path or 2D region) using any known technique. For example, autocomplete component 152 may automatically identify a target region based on an analysis of a set of prior strokes and/or an associated region of the reference image (e.g., identifying a region of the reference image based on similarity to a region associated with a stroke, using edge detection to identify boundaries for the target region, identifying a trend line based on prior strokes and extending the trend line based on the reference image, and the like). As explained in more detail below, autocomplete component 152 can use stroke synthesizer 160 to successively generate stroke predictions (e.g., along a 1D path) until some designated condition occurs (e.g., the target region is filled, a particular prediction fails to converge within a designated number of iterations, a particular prediction fails to converge within a threshold of similarity, etc.).

Additionally or alternatively, workflow clone component 154 can generate predicted strokes based on one or more inputs received via workflow clone tool 128. In an example implementation, a user selects a group of prior strokes and a target region (e.g., a 1D guide path or 2D region), and workflow clone component 154 can use stroke synthesizer 160 to generate stroke predictions for the target region. As with autocomplete, successive strokes can be predicted (e.g., along a 1D path) until some designated condition occurs. The condition may, but need not, be the same as the condition used for autocomplete. In some embodiments, prediction of subsequent strokes may stop when the predicted strokes reach the end of a 1D guide path. In other embodiments, prediction of subsequent strokes may stop when a particular prediction fails to converge within a designated number of iterations. In yet another embodiment, the predictions may stop when a particular prediction fails to converge within a threshold of similarity. These and other conditions may be designated for autocomplete and/or workflow clone.

In some embodiments, strokes are predicted using an algorithm implemented by stroke synthesizer 160, which may include an initialization component 162, a search component 164, and an assignment component 166. In the embodiment illustrated in FIG. 1, to generate a prediction for a particular future stroke, initialization component 160 initializes one or more predictions for the future stroke. Predicted strokes can be initialized based on previously drawn strokes. For example, a prior stroke can be copied, transformed to a position corresponding to the future stroke, and used as an initial prediction for a particular future stroke. In some embodiments, a designated number of prior strokes (e.g., immediately preceding the particular future stroke, within a spatio-temporal neighborhood, etc.) can each be propagated and used to initialize a possible prediction, applying an appropriate transformation to each prior stroke to locate the prediction at a corresponding position for the future stroke in the target region. In some embodiments, the position of the future stroke can be determined by identifying a transformation between consecutive prior strokes (e.g., consecutive hatches) and applying the transformation to the position of a current stroke (e.g., a most recently drawn hatch) to arrive at the position for the future stroke (e.g., the next hatch). As explained below, each initialized prediction can be refined by iteratively executing search and assignment steps.

In the embodiment illustrated in FIG. 1, for each initialized prediction, search component 164 searches a designated number of prior strokes to find a transformed prior stroke that improves the current prediction. In doing so, search component 164 can evaluate reference neighborhoods and/or stroke neighborhoods for the current prediction and the prior strokes. More specifically, a designated number of prior strokes can be searched and evaluated to identify a prior stroke that minimizes a designated energy function considering stroke-to-stroke and image-patch-to-image-patch comparisons. The energy function provides a measure of similarity, so minimizing the energy function maximizes similarity. A current stroke (e.g., the most recently drawn stroke, the most recently finalized predicted stroke, etc.), or some other baseline stroke, can be used as a baseline for comparison. For a particular initialized prediction of a subsequent stroke, any or all of the designated number of prior strokes can be transformed and compared with the current stroke by comparing their stroke neighborhoods (e.g., stroke-to-stroke, sample-to-sample, etc.) and associated reference neighborhoods (e.g., patch-to-patch, property-to-property, etc.). In some embodiments, only a subset of the designated number of prior strokes are transformed and compared with the current stroke. In one example, the subset can be identified based on similarity of associated reference neighborhoods (e.g., patch-to-patch, property-to-property, etc.). In any of these examples, the stroke that minimizes the energy function (whether one of the transformed prior strokes or the current prediction) can be selected as the output.

Generally, the search step identifies a transformed prior stroke that improves the current prediction based on a comparison of stroke and reference neighborhoods for the prior stroke, on the one hand, to stroke and reference neighborhoods for a baseline stroke (e.g., the most recently drawn stroke) on the other. The effect is to identify a prior stroke that matches the baseline stroke in terms of the combination of artistic style and reference image correspondence. As such, the energy function can include elements that quantify the similarity or difference between stroke and reference neighborhoods. In some embodiments, the comparison between stroke and reference neighborhoods can include an estimate of a transformation (e.g., affine, deformation, etc.) that minimizes the difference. As a practical matter, such a transformation (e.g., rotation, scale, etc.) can serve to identify certain correspondences (e.g., similarities along a curved boundary, similarities across different perspectives, etc.).

The energy function can include one or more elements that quantify the similarity or difference between stroke neighborhoods. A stroke neighborhood, n(b), generally refers to the union of a stroke's sample neighborhoods (e.g., the set of strokes whose spatial and temporal distance from any given point sample in b is within a designated spatio-temporal neighborhood of the point sample). Thus, in one example, the similarity between stroke neighborhoods for two strokes $b_o$ and $b_i$ can be characterized by a measure of similarity between one or more sets of paired strokes from each neighborhood, a measure of similarity between representative strokes for each neighborhood, a measure of similarity between a representative stroke and its neighborhood, some combination thereof, or otherwise. For example, stroke neighborhoods, $n(b_o)$ and $n(b_i)$, can be aligned by identifying representative strokes for each neighborhood, transforming the local orientation of one or both of the neighborhoods to align the representative strokes, and matching pairs of strokes, one from each neighborhood. A representative stroke for a stroke neighborhood n(b) of a stroke b can be determined in any suitable way (e.g., selection of one of the strokes in the stroke neighborhood as being representative such as stroke b, averaging some or all strokes in the stroke neighborhood, weighting more recent or spatially closer strokes to stroke b higher, some other statistical technique, etc.). Similarity between stroke neighborhoods can be determined based on a comparison of any or all of the stroke pairs (e.g., representative strokes, each of the stroke pairs, etc.). Similarity between stroke neighborhoods for two strokes $b_o$ and $b_i$ may additionally or alternatively include a measure of similarity, for each stroke neighborhood being compared, between a representative stroke and its neighborhood, such as the sum of squared difference between stroke b and the representative stroke of the stroke neighborhood n(b). These are meant simply as examples, and any technique may be applied to determine similarity between stroke neighborhoods.

Additionally or alternatively, the energy function can include one or more elements that quantify the similarity or difference between reference neighborhoods. A reference neighborhood of a particular point sample or stroke generally refers to a region (e.g., a patch) of a reference image associated with the point sample or stroke. Generally, a drawing may be created on top of, with respect to, or otherwise associated with, a particular reference image. Thus, the reference neighborhood is a portion of the associated reference image corresponding to a particular portion of the drawing. A reference neighborhood for a particular stroke can be defined by a patch of any shape (e.g., a square patch) and any size. The patch can be associated with a stroke in any way, such as by centering the patch at any portion of the stroke (e.g., the center position, one of the stroke's samples, etc.), considering a transformation from canvas coordinates to image coordinates, and the like. In some embodiments, each point sample may be associated with its own reference neighborhood (e.g., associated patch of the reference image). Each patch can include any number of feature channels (e.g., three color channels in the CIE L*c*h color space and two gradient channels of luminance (L, c, h, $\nabla_x L$, $\nabla_y L$), etc.).

Similarity between reference neighborhoods for two strokes $b_o$ and $b_i$ can be characterized by a measure of similarity between the reference neighborhoods. For example, one or more patches of a reference image associated with each stroke can be compared to determine the measure of similarity. In one example, a representative patch for each stroke can be identified (e.g., by selecting a patch centered to a particular stroke, averaging patches for any number of samples for a particular stroke, using some other suitable technique for identifying a composite patch, etc.), and the distance between representative patches for each stroke can be used as the measure of similarity. In another example, any number of patches may be identified for a given stroke, and multiple patches can be compared for different strokes. For example, given two strokes $b_o$ and $b_i$, the strokes can be aligned by matching their corresponding sample pairs ($s_o$, $s_i$) according to sample index, and associated patches for each sample can be compared and aggregated to arrive at the measure of similarity. Generally, to compare patches, the patches can be sampled (e.g., sampling at the corners, along the boundary, throughout the patch, etc.), and similarity can be determined as the sum of the squared distances between corresponding reference patch samples (e.g., pixel values, color intensity, etc.) for each aligned sample. Any suitable technique may be applied to compare patches and/or patch samples.

As such, for any or all of the initialized predictions, search component 164 can identify a prior stroke and a transformation that minimizes the designated energy function. Assignment component 166 assigns the identified stroke to the current prediction, applying a corresponding transformation to the selected stroke to locate it at a position for the current prediction in the target region. For example, the values for rotation and scale that minimized the energy function in the search step can be applied during the assignment step, and a corresponding translation can be determined to locate the selected stroke at the position of the current prediction in the target region. The search and assignment steps can be repeated a designated number of iterations, until the current prediction converges within a threshold of similarity, or based on some other criteria (whether user-selected, pre-determined, or otherwise). The predictions resulting from refining each initialized prediction can be compared, and the best one (e.g., the one that minimizes the energy function) can be used as the prediction for the particular future stroke. The process can be repeated to generate predictions for any number of future strokes.

Figures 2A, 2B:
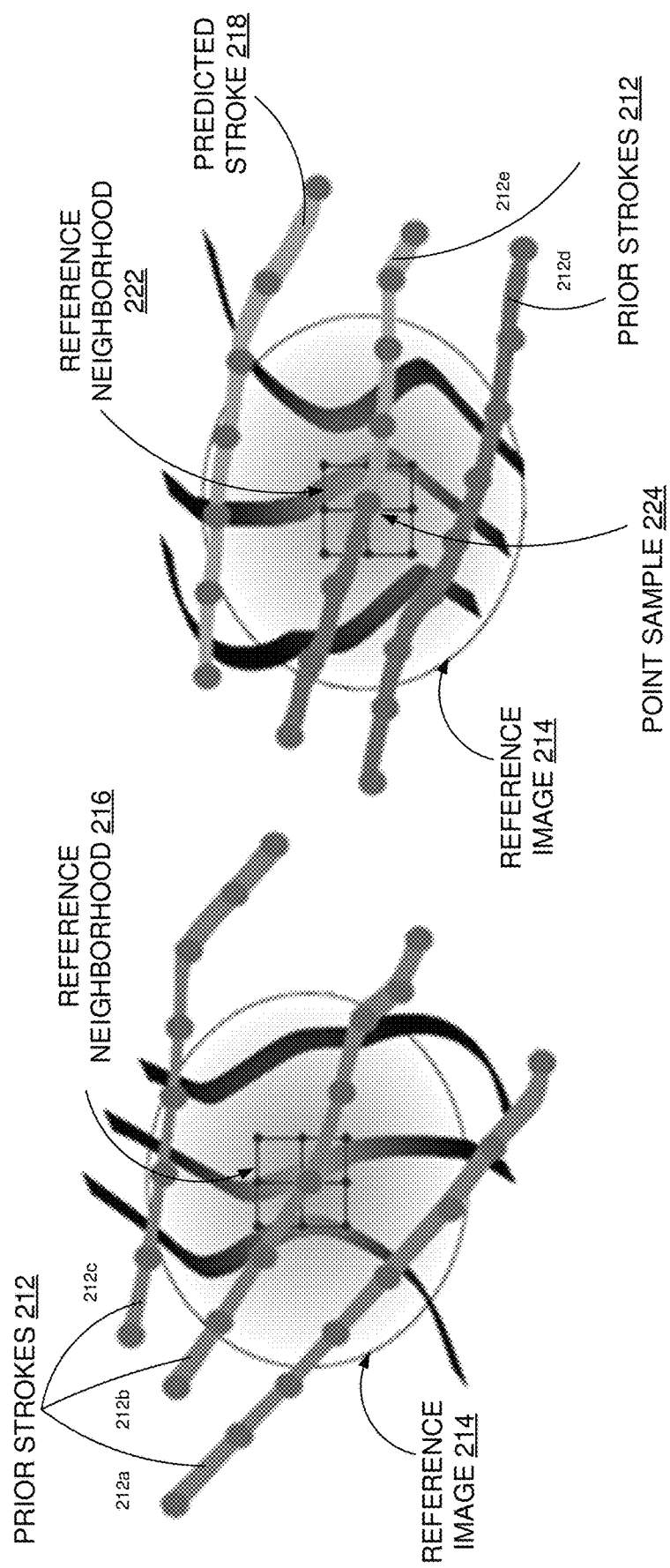
FIGS. 2A-2B illustrate an example technique for predicting strokes based on prior strokes and a reference image, in accordance with various embodiments of the present invention.

Turning now to FIGS. 2A and 2B, FIGS. 2A and 2B illustrate an example technique for predicting strokes based on prior strokes and a reference image, in accordance with embodiments described herein. The example technique may be implemented by stroke prediction tool 150 of FIG. 1. At a high level, FIGS. 2A and 2B illustrate different regions of a stroke-based drawing on a digital canvas. In this example, the drawing (e.g., prior strokes 212) is superimposed on top of a reference image 214. In order to generate predictions for future strokes in the drawings, prior strokes 212 and reference image 214 may be considered. More specifically, the predictions can be based on an analysis of stroke neighborhoods (e.g., stroke-to-stroke comparisons) and reference neighborhoods (e.g., patch-to-patch comparisons). As a result, the predictions can reflect the combination of artistic style and reference image correspondence present in a partial drawing.

More specifically, one of the prior strokes (e.g. the most recently drawn stroke 212e) can be used as a baseline for comparison, and any number of initialized predictions for a future stroke (e.g., predicted stroke 218) may be iteratively refined to improve the similarity to the baseline stroke, considering stroke and reference neighborhoods. For example, each of prior strokes 212a-e can be transformed to generate different initialized predictions for predicted stroke 218. Each prediction can be compared to the baseline stroke, for example, by computing an energy function that computes a measure of similarity between stroke neighborhoods and similarity between reference neighborhoods. The energy function can quantify similarity between neighborhoods in any way. For example, similarity between stroke neighborhoods can be computed based on a comparison of point samples for strokes (e.g., one or more stroke pairs from the stroke neighborhoods, representative strokes for two stroke neighborhoods, etc.). For example, the difference between two stroke point samples may be characterized based on the difference between the structure (i.e., spatial parameters), $\hat{p}(s', s)$, appearance parameters, $\hat{a}(s', s)$, and time stamp (i.e. sample index), $\hat{t}(s', s)$, of the point samples. Thus, the difference between samples, $\hat{u}(s', s)$, can be calculated by $\hat{u}(s', s)=(\hat{p}(s', s), \hat{a}(s', s), \hat{t}(s', s))$, where $\hat{p}(s', s)$ is measured from the local coordinate frame of s. The difference between strokes can be characterize based on the difference between point sample sets for the strokes, which can be represented as $\hat{u}(b', b)=\{\hat{u}(s', s)|s'\in b', s\in b\}$. Similarity between reference neighborhoods may be characterized by similarity between associated image patches of reference image 214. The associated image patch for a particular stroke can be identified in any way. Taking stroke 212e as an example, a patch of a designated size and/or shape (e.g., reference neighborhood 222) may be determined by association with one of the point samples for the stroke (e.g., point sample 224), for example, based on a transformation from canvas coordinates to image coordinates.

Thus, stroke and reference neighborhoods for each of the initialized predictions can be compared with stroke and reference neighborhoods for a baseline stroke (e.g., prior stroke 212e), and the prediction that minimizes the difference can be assigned. Each of the possible predictions can be iteratively refined through successive search and assignment steps until some designated condition occurs (e.g., a designated number of iterations, until one of the predictions converges within a threshold of similarity, based on some other criteria, etc.). The outputs for each of the initialized predictions can be compared, and the best one (e.g., the one that minimizes the energy function) can be used as the prediction for the particular future stroke (e.g., predicted stroke 218). The process can be repeated to generate predictions for any number of future strokes. In some embodiments, predicted stroke 218 may be identified as a suggestion by presenting it in a different color, thickness, highlighting, shading, or other indication that it is a prediction. In this example, a user may accept, decline, or modify stroke prediction 218.

Figure 3:
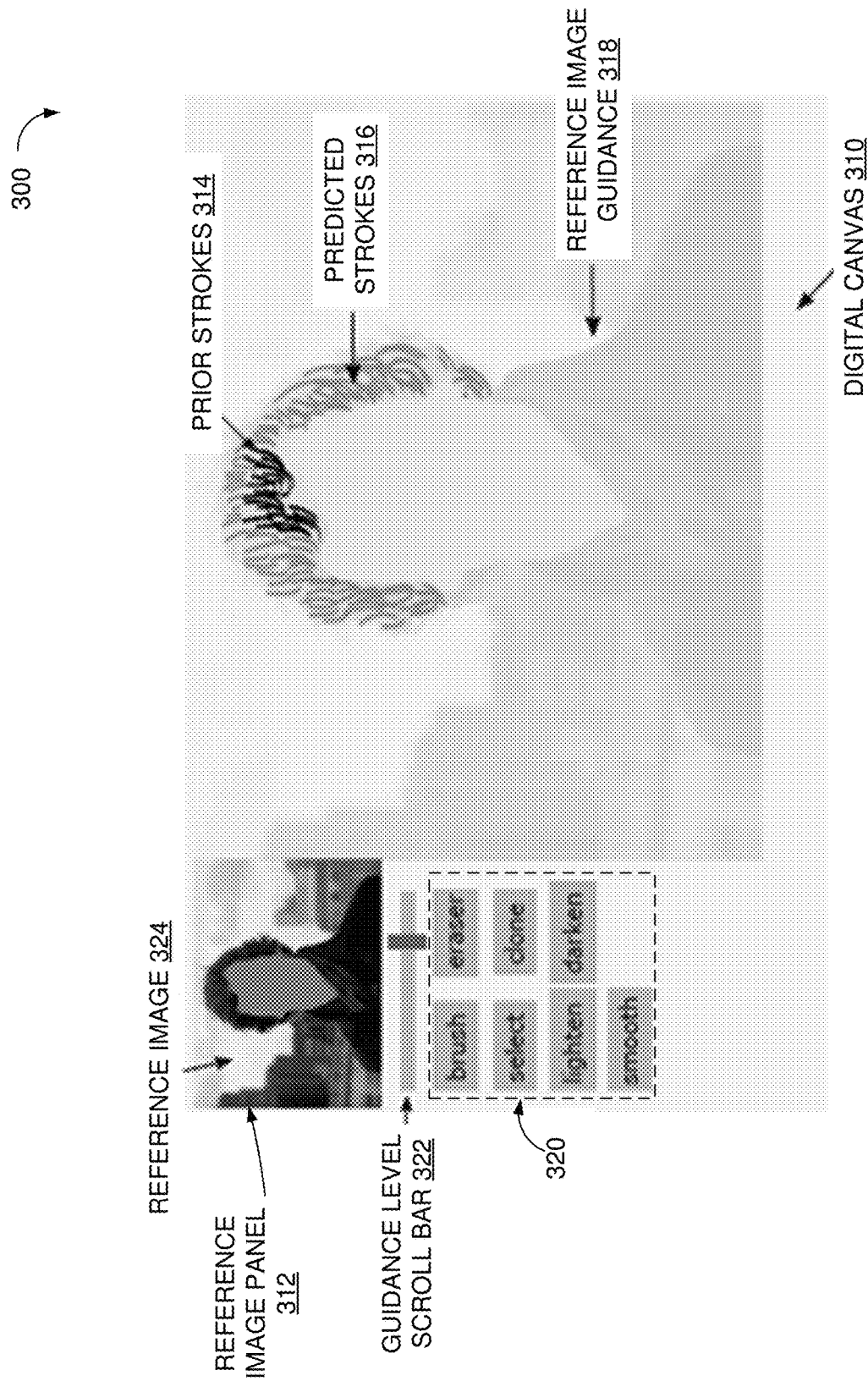
FIG. 3 illustrates an example interactive user interface for generating stroke predictions, in accordance with embodiments of the present invention.

Turning now to FIG. 3, FIG. 3 illustrates an example interactive user interface for generating stroke predictions, in accordance with embodiments of the present invention. Interactive UI 300 may be provided as part of a drawing application, such as drawing application 110 from FIG. 1. Interactive UI 300 may include a reference image panel 312, a reference image 324, guidance level scroll bar 322, widget panel 320, and digital canvas 310. In this example, digital canvas 310 displays reference image guidance 318 based on reference image 324 and the position of guidance level scroll bar 322 (e.g., by implementing a corresponding amount of transparency, level of detail, etc.). In this example, a user has begun drawing a sketch by drawing prior strokes 314 on digital canvas 310 over reference image guidance 318 (e.g., by drawing in a layer superimposed on top of reference image 324). More specifically, prior strokes 314 have been drawn as a sketch of the hair of the person in the reference image. In this example, interactive UI 300 presents predicted strokes 316. The predicted strokes 316 can be generated upon determining that a threshold number of prior strokes are present, based on an analysis of stroke neighborhoods (e.g., stroke-to-stroke comparisons) and reference neighborhoods (e.g., patch-to-patch comparisons), and the like. As a result, the predictions can reflect the combination of artistic style and reference image correspondence present in prior strokes 314.

In some embodiments, a user can specify a reference image 324, which can be presented on digital canvas 310. For example, a user may select a reference image using reference image panel 312. The reference image may be any type of image or image type (e.g., JPEG, PNG, etc.). The selected reference image may be displayed in reference image panel 312 and/or on digital canvas 310. Guidance level scroll bar 322, which may correspond to guidance level selector tool 126 of FIG. 1, can be used to adjust the opacity of the selected reference image in reference image panel 312. Additionally or alternatively, guidance level scroll bar 322 can allow a user to select a level of detail of reference image guidance 318 to present on digital canvas 310. For example, reference image guidance 318 may be presented with different levels of detail for visual guidance. In some embodiments, at low levels of detail, only salient lines may be displayed, and as the guidance level increase, more intensity levels may emerge until the original reference image 324 is reproduced as reference image guidance 318. In some embodiments, reference image guidance 318 can be deformed to match prior strokes 314 and the reference image 324. In some embodiments, regardless of the level of detail displayed on digital canvas 310, predictions can consider the underlying reference image in full detail. For example, a user may desire not to see any reference image guidance while drawing, but would still like stroke predictions to appear on the digital canvas based on a reference image. In this case, the guidance level scroll bar 322 can be moved all the way to the left, for example, so that no reference image guidance is presented on the digital canvas. In this scenario, predicted strokes 316 may nevertheless be generated based on correspondence with the reference image.

Generally, the interactive UI 300 can access a set of strokes for a stroke-based drawing, such as a sketch. For example, a user may draw on digital canvas 310 with any suitable input device (e.g., pen, pencil, stylus, computer mouse, etc.). As another example, a user may import a drawing and/or strokes onto digital canvas 310. Any suitable method for adding a set of strokes to digital canvas 310 may be used. In the example illustrated in FIG. 3, reference image 324 is presented on digital canvas 310 in a transparent manner as reference image guidance 318. A user has drawn prior strokes 314 on top of the reference image 324, and predicted strokes 316 have been generated and presented in interactive UI 300. In some embodiments, when potential repetition of strokes is detected based on prior strokes 314 (e.g., some designated threshold of similarity among a designated number of prior strokes), predicted strokes 316 are generated for a target region (e.g., a user designated region, an automatically detected region, etc.) and can be presented in the target region. To differentiate predicted strokes 316 from prior strokes 314, predicted strokes 316 may appear as a different color, thickness, highlighting, or shading, or other indication differentiating predicted strokes 316 from prior strokes 314. In effect, predicted strokes 316 may take into account the density of prior strokes 314, the color, tone, texture, shape, and other characteristics of the underlying reference image. For example, the pattern of predicted strokes 316 may resemble the pattern of prior strokes 314. In some embodiments, predicted strokes 316 may appear denser in darker areas of the target region and more sparse in brighter areas of the target region. These and other variations may be implemented.

Widget panel 320 may contain any number of tools suitable for generating a drawing and/or predicting future strokes. For example, widget panel 320 may include any existing drawing tool, such as a brush, eraser, selection tool, and the like. In some embodiments, widget panel can include a workflow clone tool (the clone button in FIG. 3) and/or an autocomplete tool (not depicted) that can toggle workflow clone and autocomplete modes, respectively. In some embodiments, a user can accept stroke predictions 316 via any suitable interaction element (e.g., an acceptance tool in widget panel 320 (not depicted), a popup button or menu associated with the predictions, a hotkey or keyboard shortcut, or any other tool). In some embodiments, a user may accept a portion of the predicted strokes 316 by using a selection tool in widget panel 320 to choose particular predicted strokes or a group of predicted strokes. Additionally or alternatively, a user might ignore suggested stroke predictions 316 and continue drawing on digital canvas 310. If a user continues drawing, suggested stroke predictions may be updated, recomputed, or otherwise continue to be generated (e.g., in real-time), considering newly drawn strokes and the underlying reference image.

Figure 4B:
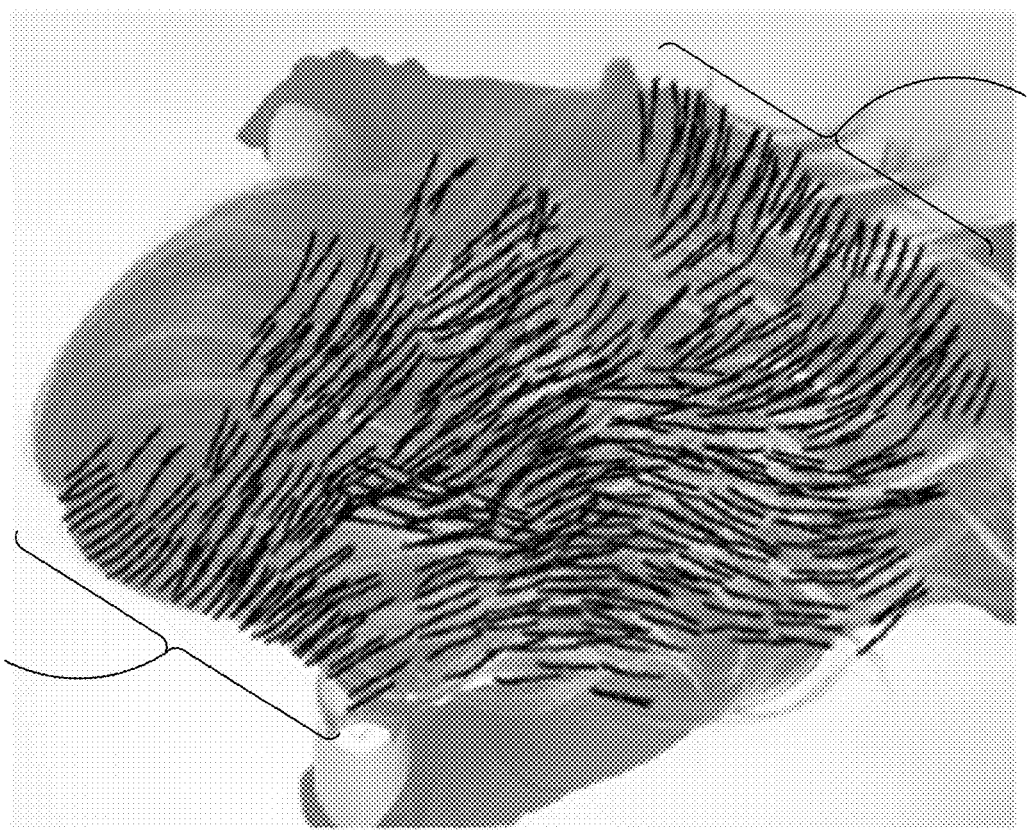
FIGS. 4A-4B illustrate an example autocomplete operation, in accordance with various embodiments of the present disclosure.
Figure 4A:
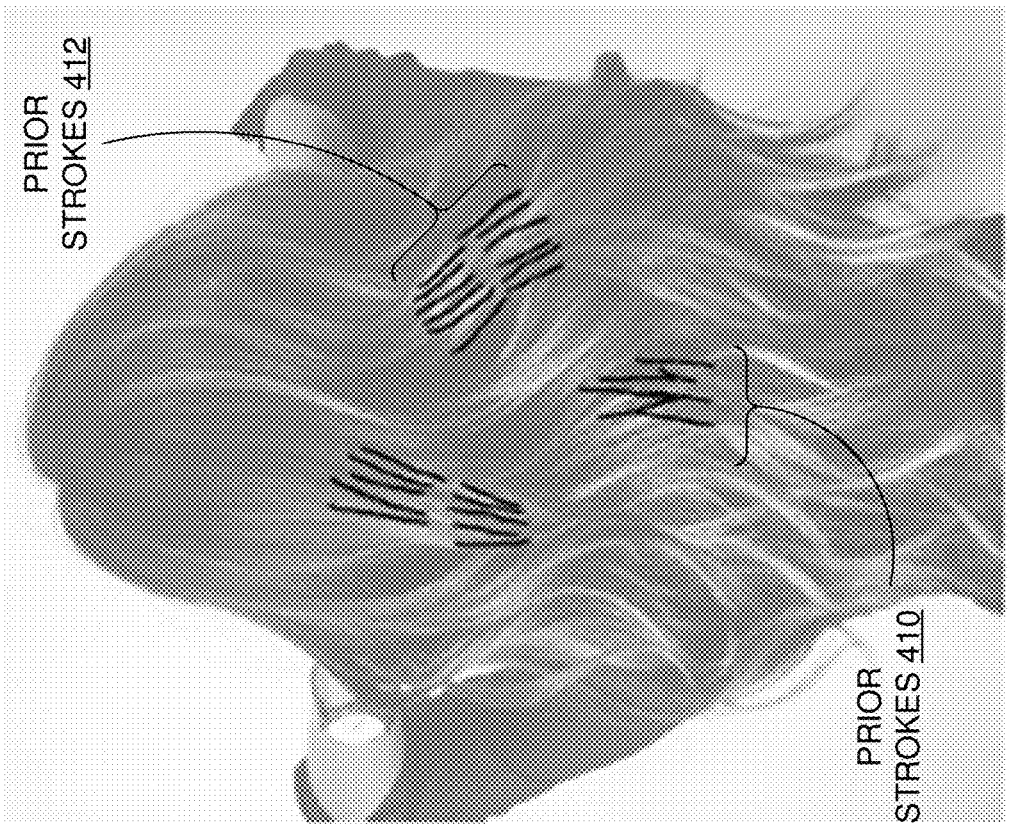

Turning now to FIGS. 4A and 4B, FIGS. 4A and 4B illustrate an example autocomplete operation, in accordance with embodiments described herein. FIG. 4A illustrates an example drawing canvas with a set of prior strokes of a partial sketch drawn over a reference image. FIG. 4B illustrates an example of corresponding predicted strokes generated based on the prior strokes and the reference image. More specifically, FIG. 4A shows a number of strokes of a partial sketch (e.g., prior strokes 410 and 412) drawn over a reference image on a digital canvas (e.g., digital canvas 310 of FIG. 3). For example, an artist may draw prior strokes 410 and 412 to resemble properties of the underlying reference image (e.g., the texture of the woman's hair in FIG. 4A). FIG. 4B shows examples of suggested predicted strokes 414 and 416 generated based on prior strokes 412 and the reference image. In this example, the predicted strokes replicate the hatching patterns reflected by prior strokes 410 and 412, as well as the correspondence between the prior strokes and the reference image. As described above with respect to FIG. 3, predicted strokes 414 and 416 can be presented in a distinguishing manner from prior strokes 410 and 412 of FIG. 4A. For example, predicted strokes may be a different color, thickness, highlighting, or shading, among other possible distinguishing characteristics. The user can accept, decline, or modify any or all of predicted strokes of FIG. 4B. For example, a user can select some or all of predicted strokes 414 and 416 and accept them. FIG. 4B illustrates all of the suggested stroke predictions (including predicted strokes 414 and 416) having been accepted.

Figure 5B:
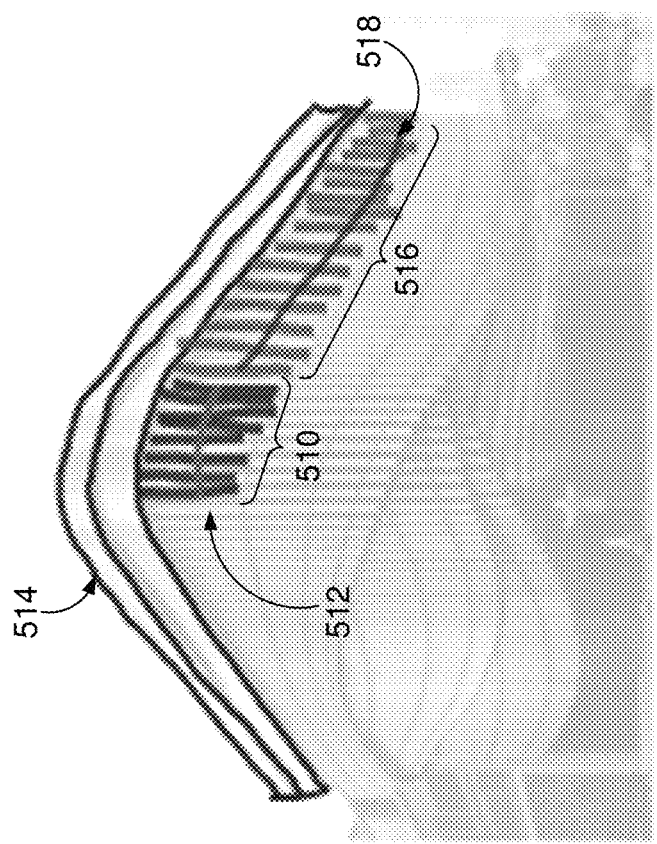
FIGS. 5A-5B illustrate an example workflow clone operation, in accordance with various embodiments of the present disclosure.
Figure 5A:
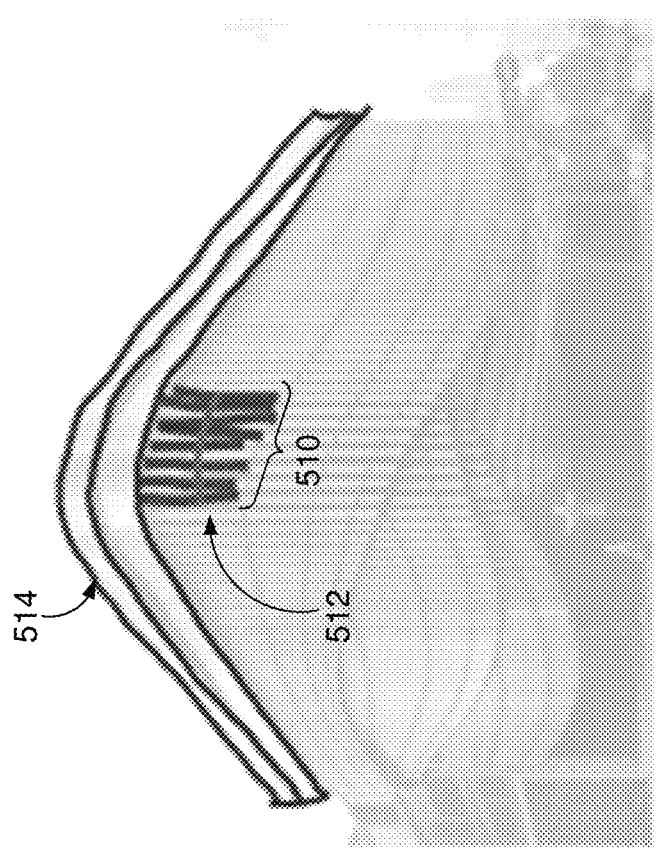

FIGS. 5A and 5B illustrate an example workflow clone operation, in accordance with embodiments described herein. At a high level, a user may toggle a workflow clone mode (e.g., by selecting the clone tool from widget panel 320 of FIG. 3). The user may then select a group of strokes to copy, and may draw a 1D guide path, to generate stroke predictions along the guide path. More specifically, in FIG. 5A, a user may draw strokes 510 and 514 on a digital canvas over a reference image. In some embodiments, the user may draw a line 512 to select strokes 510 that intersect line 512. This is meant simply as an example, and any technique can be implemented for selecting a set of strokes to copy. Further, the user may designate a target region for which predictions should be generated. In the example illustrated in FIG. 5B, the user has drawn a guide path 518 indicating where stroke predictions should be propagated. Stroke predictions 516 are then generated and presented along guide path 518, considering the selected prior strokes 510 as well as the underlying reference image. In this example, the predicted strokes replicate the hatching patterns reflected by prior strokes 510, as well as the correspondence between the prior strokes and the reference image. Stroke predictions 516 may be presented in a distinguishing manner, for example, by using a different color, shading, highlighting, etc. The user may accept, decline, or modify the suggested stroke predictions in any suitable way.

Example Flow Diagrams

Figure 6:
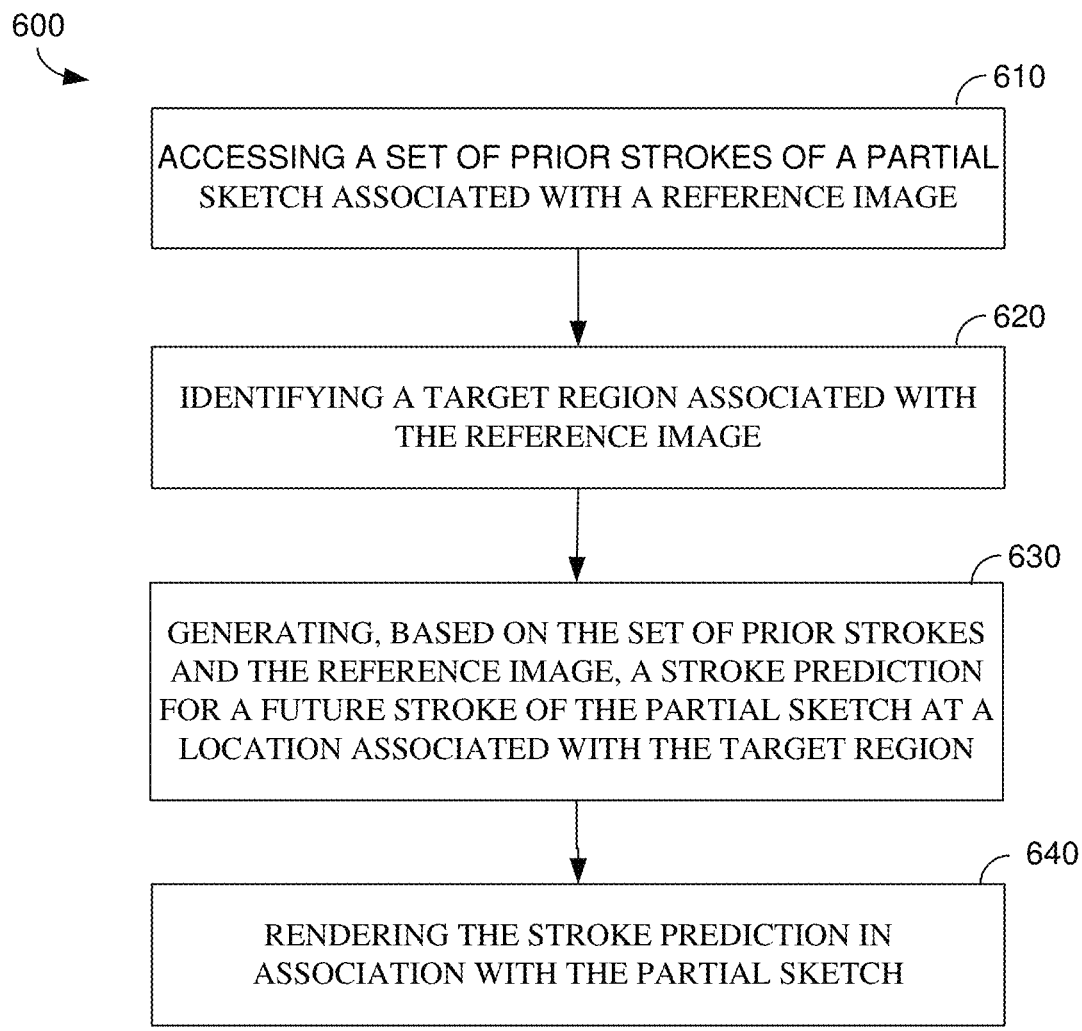
FIG. 6 is a flow diagram showing a method for generating stroke predictions, in accordance with embodiments of the present invention.
Figure 7:
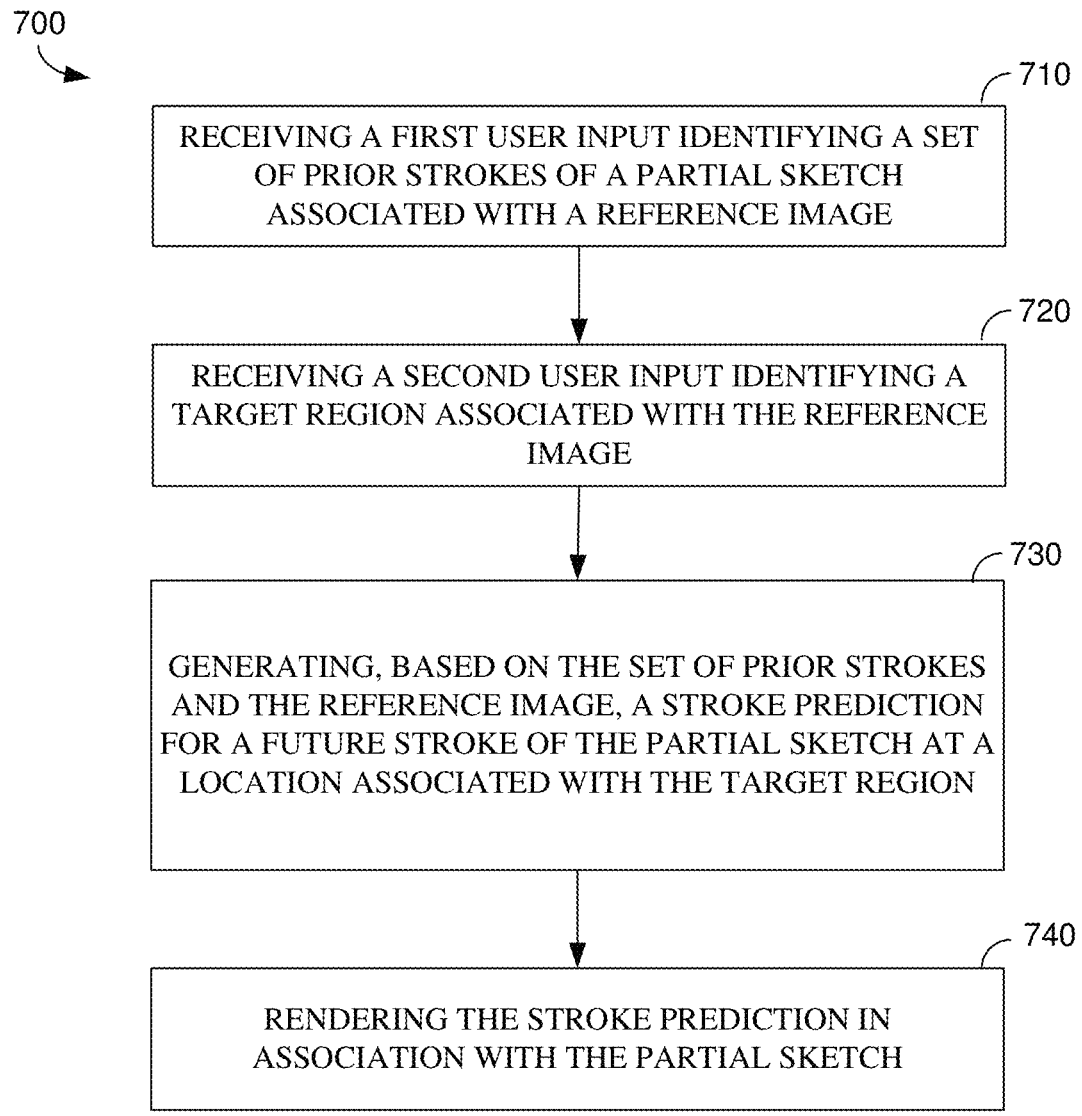
FIG. 7 is a flow diagram showing another method for generating stroke predictions, in accordance with embodiments of the present invention.

With reference now to FIGS. 6-7, flow diagrams are provided illustrating methods for generating stroke predictions. Each block of the methods 600 and 700, and any other methods described herein, comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 600 and/or 700 may be implemented by drawing application 110 (e.g., stroke prediction tool 150) of FIG. 1.

Turning initially to FIG. 6, FIG. 6 illustrates a method 600 for generating stroke predictions, in accordance with embodiments described herein. Initially at block 610, a set of prior strokes of a partial sketch associated with a reference image are accessed. For example, a designated number of prior strokes within a spatio-temporal neighborhood of a particular stroke (e.g., a most recently entered stroke, a most recently predicted stroke, a selected stroke, etc.) can be accessed. At block 620, a target region associated with the reference image is identified. In some cases, a target region (e.g., a 1D path or 2D region) is identified based on an analysis of the set of prior strokes and/or an associated region of the reference image (e.g., identifying a region of the reference image based on similarity to a region associated with a stroke, using edge detection to identify boundaries for the target region, identifying a trend line based on prior strokes and extending the trend line based on the reference image, etc.). At block 630, a stroke prediction for a future stroke of the partial sketch is generated at a location associated with the target region based on the set of prior strokes and the reference image. The stroke prediction can be generated by initializing one or more initial predictions and iteratively executing search and assignment steps to incrementally improve the predictions through successive iterations. Stroke predictions can be generated along a 1D path associated with the target region until some designated condition occurs (e.g., the target region is filled, a particular prediction fails to converge within a designated number of iterations, a particular prediction fails to converge within a threshold of similarity, etc.). At block 640, the stroke prediction is rendered in association with the partial sketch. For example, the stroke prediction can be identified as a suggestion by rendering it with a different appearance than the partial sketch (e.g., a different color, thickness, highlighting, shading, etc.) or some other indication that it is a prediction.

Referring now to FIG. 7, FIG. 7 illustrates a method 700 for generating stroke predictions, in accordance with embodiments described herein. Initially at block 710, a first user input is received that identifies a set of prior strokes of a partial sketch associated with a reference image. At block 720, a second user input is received that identifies a target region associated with the reference image. At block 730, a stroke prediction for a future stroke of the partial sketch is generated at a location associated with the target region based on the set of prior strokes and the reference image. The stroke prediction can be generated by initializing one or more initial predictions and iteratively executing search and assignment steps to incrementally improve the predictions through successive iterations. Stroke predictions can be generated along a 1D path associated with the target region until some designated condition occurs (e.g., the target region is filled, a particular prediction fails to converge within a designated number of iterations, a particular prediction fails to converge within a threshold of similarity, etc.). At block 740, the stroke prediction is rendered in association with the partial sketch. For example, the stroke prediction can be identified as a suggestion by rendering it with a different appearance than the partial sketch (e.g., a different color, thickness, highlighting, shading, etc.) or some other indication that it is a prediction.

Exemplary Operating Environment

Figure 8:
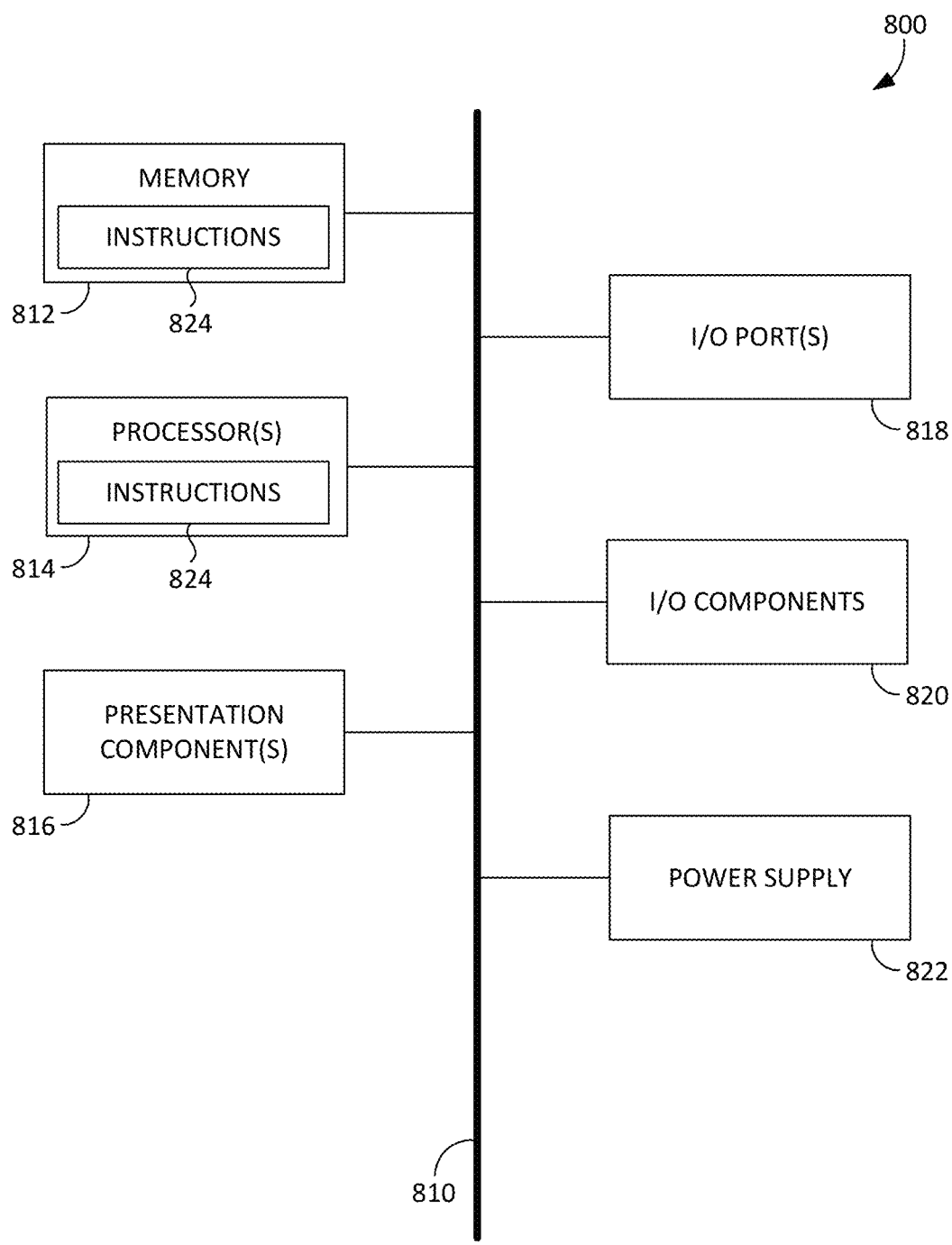
FIG. 8 is a block diagram of an exemplary operating environment in which embodiments of the present invention may be employed.

Having described an overview of embodiments of the present invention, an exemplary operating environment in which embodiments of the present invention may be implemented is described below in order to provide a general context for various aspects of the present invention. Referring now to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 800. Computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of computing device 800 to render immersive augmented reality or virtual reality.

Embodiments described herein support generation of stroke predictions based on prior strokes and a reference image. The components described herein refer to integrated components of a stroke prediction system. The integrated components refer to the hardware architecture and software framework that support functionality using the stroke prediction system. The hardware architecture refers to physical components and interrelationships thereof, and the software framework refers to software providing functionality that can be implemented with hardware embodied on a device.

The end-to-end software-based system can operate within the stroke prediction system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for generating stroke predictions, the method comprising:
   accessing a set of prior strokes of a partial sketch superimposed on top of a reference image, distinct from the partial sketch;
   identifying a target region associated with the reference image;
   generating, based on the set of prior strokes and the reference image, a stroke prediction for a future stroke of the partial sketch at a location associated with the target region by iteratively minimizing an energy function considering comparisons between compared strokes of the partial sketch and between image patches of the reference image corresponding to the compared strokes; and
   rendering the stroke prediction in association with the partial sketch.

2. The method of claim 1, wherein generating the stroke prediction comprises:
   initializing, for the future stroke of the partial sketch, a plurality of stroke predictions, each of the plurality of stroke predictions being translated from a prior stroke of the set of prior strokes;
   iteratively executing search and assignment steps to incrementally improve each of the plurality of stroke predictions through successive iterations of the search and assignment steps;
   selecting, from the plurality of stroke predictions, a best stroke prediction based on a measure of similarity of stroke and reference neighborhoods between one of the plurality of stroke predictions and a baseline stroke of the partial sketch; and
   presenting the best stroke prediction as the stroke prediction for the future stroke.

3. The method of claim 1, wherein the set of prior strokes comprises a most recent stroke of the partial sketch, wherein generating the stroke prediction for the future stroke comprises evaluating each of a plurality of initialized stroke predictions against the most recent stroke based on a comparison of stroke neighborhoods and associated reference neighborhoods of the reference image.

4. The method of claim 1, wherein generating the stroke prediction for the future stroke comprises estimating a transformation that minimizes a difference between stroke and reference neighborhoods for the stroke prediction and stroke and reference neighborhoods for a most recent stroke of the partial sketch.

5. The method of claim 1, wherein the method further comprises generating successive stroke predictions for successive future strokes along a path associated with the target region until a designated condition occurs.

6. The method of claim 1, wherein accessing the set of prior strokes comprises identifying the prior strokes from a spatio-temporal neighborhood of a most recent stroke of the partial sketch.

7. The method of claim 1, wherein rendering the stroke prediction in association with the partial sketch comprises presenting the stroke prediction with at least one distinguishing characteristic from the partial sketch.

8. The method of claim 1, wherein the method further comprises rendering a plurality of stroke predictions for a plurality of future strokes, and receiving an input accepting, declining, or modifying a subset of the plurality of stroke predictions.

9. One or more computer storage media storing computer-useable instructions that, when used by one or more computing devices, cause the one or more computing devices to perform operations comprising:
   receiving a first user input identifying a set of prior strokes of a partial sketch associated with an underlying reference image, distinct from the partial sketch;
   receiving a second user input identifying a target region associated with the reference image;
   generating, based on the set of prior strokes and the reference image, a stroke prediction for a future stroke of the partial sketch at a location associated with the target region by iteratively minimizing an energy function considering comparisons between compared strokes of the partial sketch and between image patches of the reference image corresponding to the compared strokes; and
   rendering the stroke prediction in association with the partial sketch.

10. The one or more computer storage media of claim 9, wherein the second user input comprises a 1D guide path, the operations further comprising generating successive stroke predictions for successive future strokes along the 1D guide path.

11. The one or more computer storage media of claim 9, wherein generating the stroke prediction comprises:
   initializing, for the future stroke of the partial sketch, a plurality of stroke predictions, each of the plurality of stroke predictions being translated from a prior stroke of the set of prior strokes;
   iteratively executing search and assignment steps to incrementally improve each of the plurality of stroke predictions through successive iterations of the search and assignment steps;
   selecting, from the plurality of stroke predictions, a best stroke prediction based on a measure of similarity of stroke and reference neighborhoods between one of the plurality of stroke predictions and a baseline stroke of the partial sketch; and
   presenting the best stroke prediction as the stroke prediction for the future stroke.

12. The one or more computer storage media of claim 9, wherein the set of prior strokes comprises a most recent stroke of the partial sketch, wherein generating the stroke prediction for the future stroke comprises evaluating each of a plurality of initialized stroke predictions against the most recent stroke based on a comparison of stroke neighborhoods and associated reference neighborhoods of the reference image.

13. The one or more computer storage media of claim 9, wherein generating the stroke prediction for the future stroke comprises estimating a transformation that minimizes a difference between stroke and reference neighborhoods for the stroke prediction and stroke and reference neighborhoods for a most recent stroke of the partial sketch.

14. The one or more computer storage media of claim 9, the operations further comprising generating successive stroke predictions for successive future strokes along a path associated with the target region until a designated condition occurs.

15. The one or more computer storage media of claim 9, wherein accessing the set of prior strokes comprises identifying the prior strokes from a spatio-temporal neighborhood of a most recent stroke of the partial sketch.

16. The one or more computer storage media of claim 9, wherein rendering the stroke prediction in association with the partial sketch comprises presenting the stroke prediction with at least one distinguishing characteristic from the partial sketch.

17. The one or more computer storage media of claim 9, the operations further comprising rendering a plurality of stroke predictions for a plurality of future strokes, and receiving an input accepting, declining, or modifying a subset of the plurality of stroke predictions.

18. A computer system comprising:
   one or more hardware processors and memory configured to provide computer program instructions to the one or more hardware processors;
      a drawing application configured to use the one or more hardware processors to render strokes of a sketch associated with a reference image, distinct from the sketch; and
      a means for generating stroke predictions for future strokes of the sketch, using the one or more hardware processors, based on a set of prior strokes of the sketch and the reference image by iteratively minimizing an energy function considering comparisons between compared strokes of the sketch and between image patches of the reference image corresponding to the compared strokes.

\* \* \* \* \*